Sept. 19, 1944. J. T. KELLEHER 2,358,459
ABRADING MEANS AND METHOD OF MAKING SAME
Original Filed Nov. 28, 1940 6 Sheets-Sheet 1
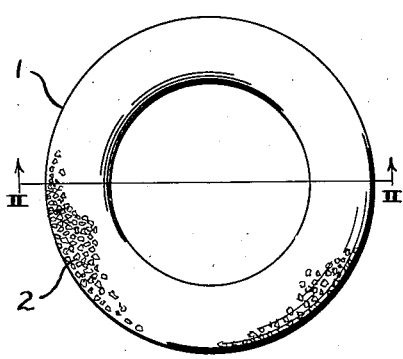
Fig. I
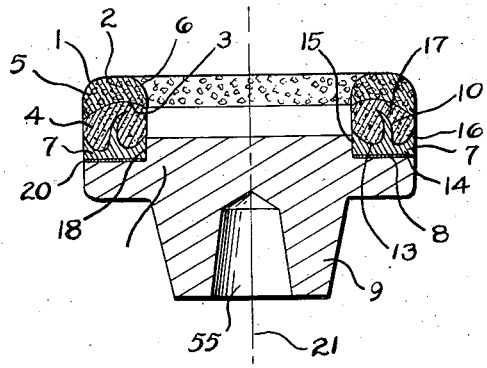
Fig. II
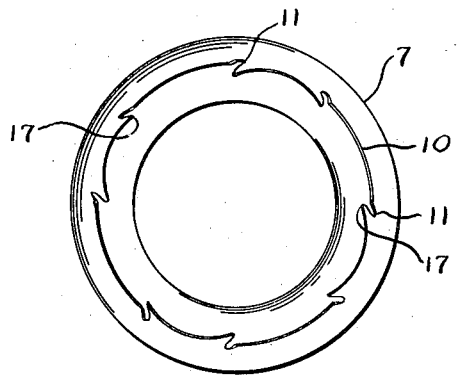
Fig. III
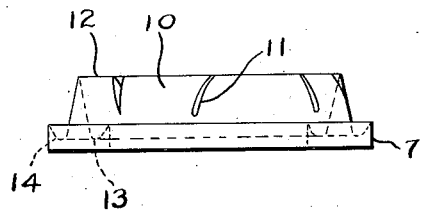
Fig. IV
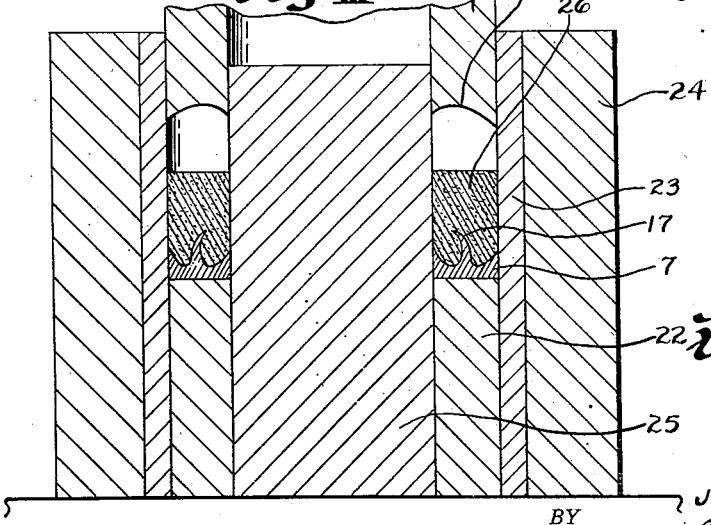
Fig. V
INVENTOR
JOSEPH T. KELLEHER
BY Louis L. Gagnon
ATTORNEY Sept. 19, 1944. J. T. KELLEHER 2,358,459
ABRADING MEANS AND METHOD OF MAKING SAME
Original Filed Nov. 28, 1940 6 Sheets-Sheet 2
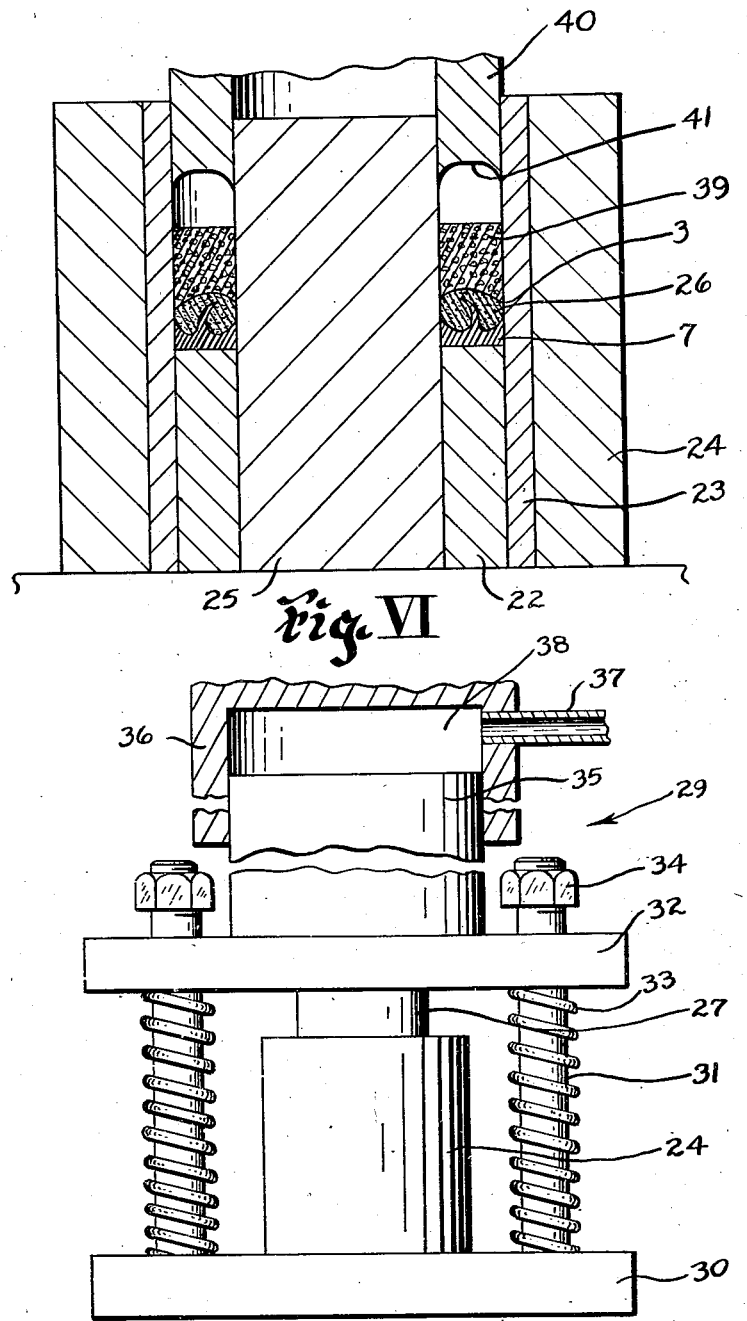
INVENTOR
JOSEPH T. KELLEHER
BY
ATTORNEY

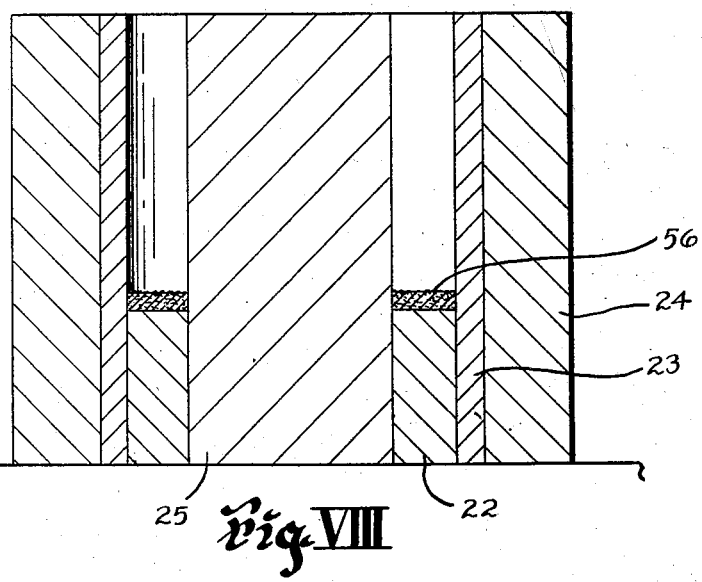
Fig. VIII
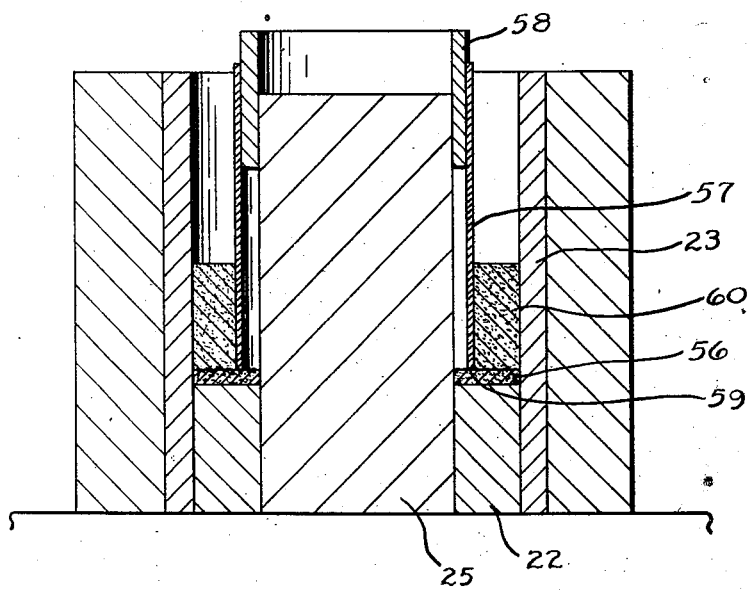
Fig. IX
INVENTOR
JOSEPH T. KELLEHER
BY
ATTORNEY

Sept. 19, 1944. J. T. KELLEHER 2,358,459
ABRADING MEANS AND METHOD OF MAKING SAME
Original Filed Nov. 28, 1940 6 Sheets-Sheet 4
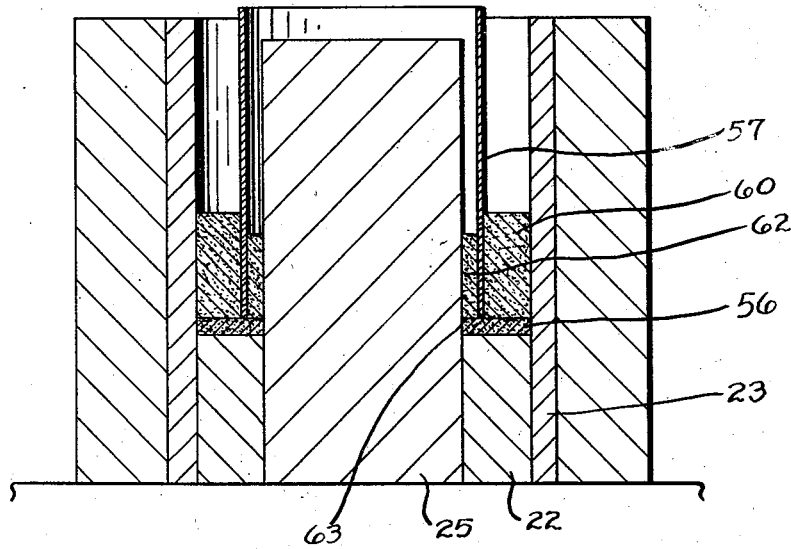
Fig. X
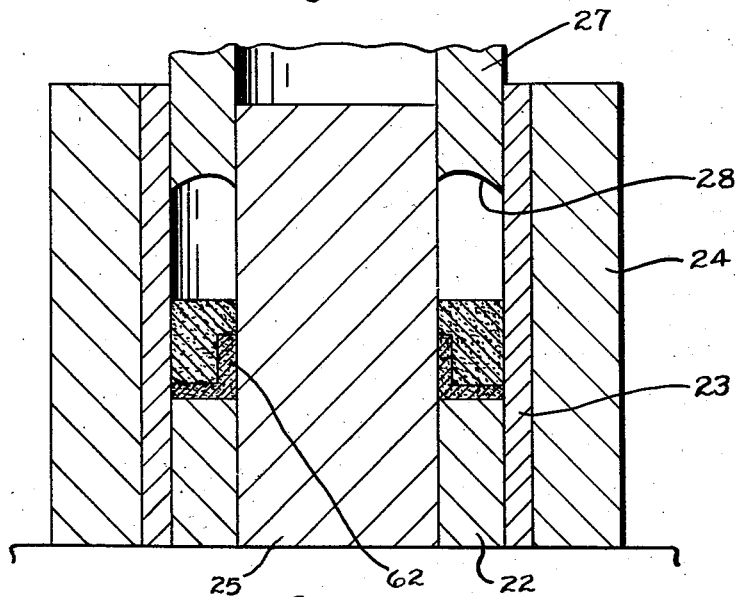
Fig. XI
INVENTOR
JOSEPH T. KELLEHER
BY
ATTORNEY Sept. 19, 1944.   J. T. KELLEHER   2,358,459
ABRADING MEANS AND METHOD OF MAKING SAME
Original Filed Nov. 28, 1940   6 Sheets-Sheet 5
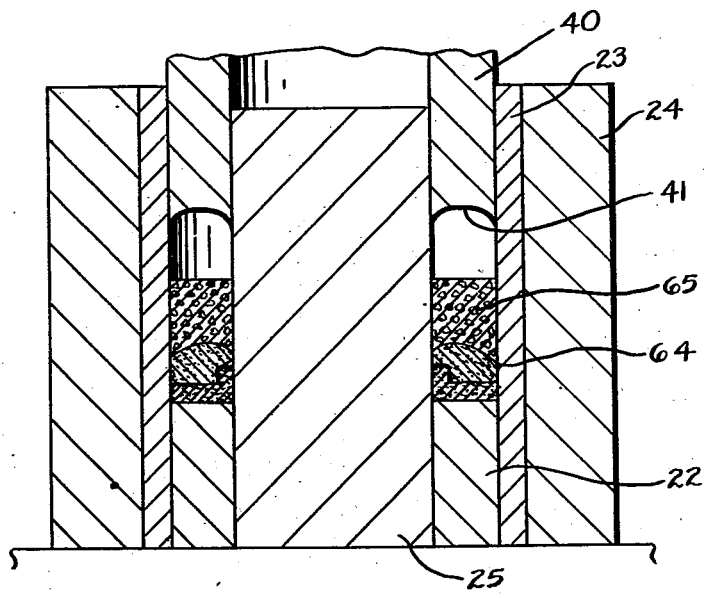
Fig. XII
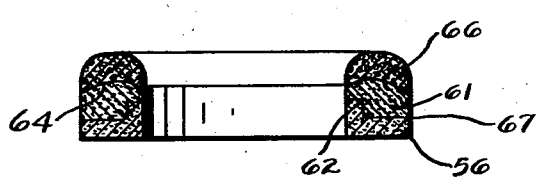
Fig. XIII
INVENTOR
JOSEPH T. KELLEHER
BY
Louis L. Gagnon
ATTORNEY Sept. 19, 1944. J. T. KELLEHER 2,358,459
ABRADING MEANS AND METHOD OF MAKING SAME
Original Filed Nov. 28, 1940 6 Sheets-Sheet 6
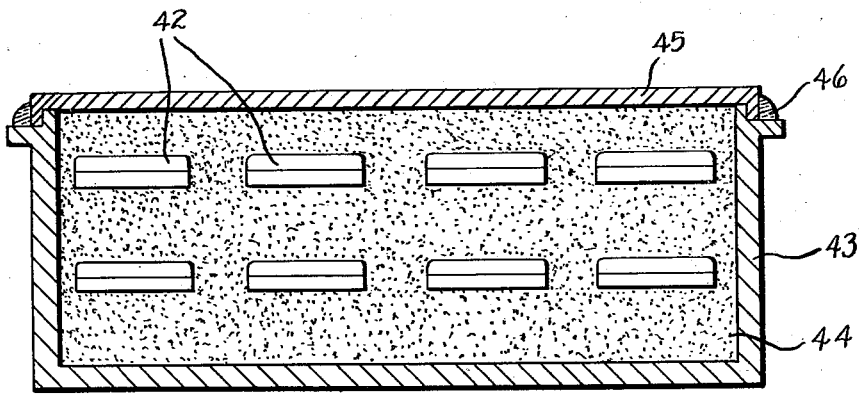
Fig. XIV
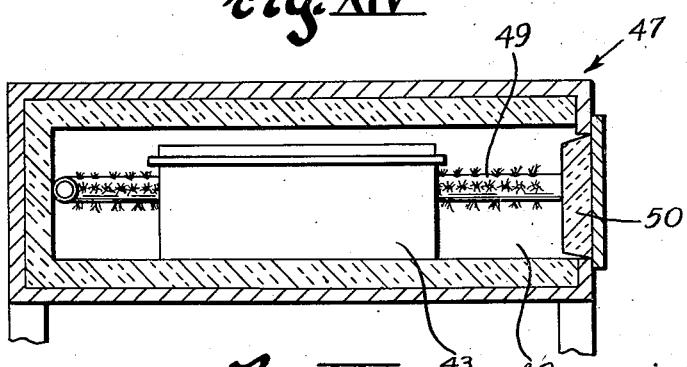
Fig. XV
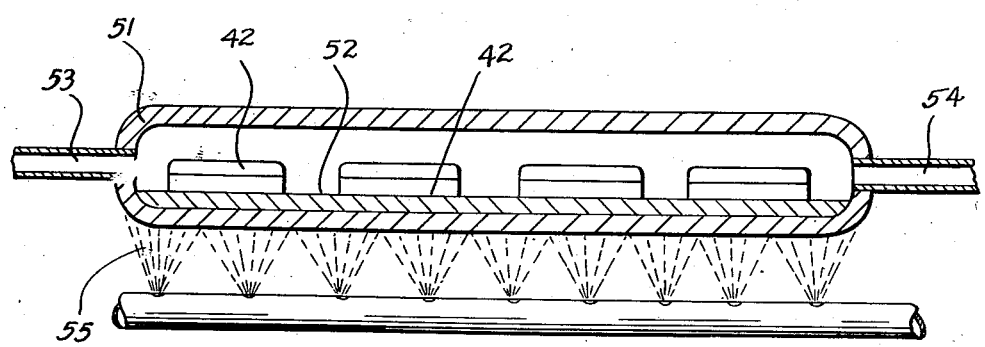
Fig. XVI
INVENTOR
JOSEPH T. KELLEHER
BY
ATTORNEY Patented Sept. 19, 1944

2,358,459

UNITED STATES PATENT OFFICE 2,358,459

ABRADING MEANS AND METHOD OF MAKING SAME

Joseph T. Kelleher, Malden, Mass., assignor of one-half to American Optical Company, Southbridge, Mass., a voluntary association of Massachusetts, and one-half to Neveroil Bearing Company, Wakefield, Mass., a corporation of Massachusetts Original application November 28, 1940, Serial No. 367,612, now Patent No. 2,339,270, dated January 18, 1944. Divided and this application April 26, 1943, Serial No. 484,576

6 Claims. (Cl. 51—309)

This invention relates to improvements in abrading tools and has particular reference to novel means and methods of making abrasive charged tools.

This application is a division of my copending application Serial No. 367,612 filed November 28, 1940, which matured into Patent No. 2,339,270, dated January 18, 1944.

One of the principal objects of the invention is to provide an improved abrasive charged tool and method of making the same whereby the particles of abrasive will be substantially uniformly distributed throughout the effective body portion of the tool and the said bonding will have a desirable resistance to wear and yet possess a holding action on said abrasive particles which will tend to insure their performing the full extent of their usefulness prior to becoming dislodged from the tool.

Another object is to provide novel means and method of forming an abrading tool with a main effective body portion comprising a mixture of particles of abrasive and particles of metal normally having non-solderable characteristics heat joined to provide a support for said abrasive particles and to provide novel means and method by which an auxiliary support may be soldered or mechanically connected with said heat joined particles of metal.

Another object is to provide an abrading tool formed of a composition of metal for supporting particles of abrasive which may be processed and rendered resistant to wear and yet possess characteristics which will positively retain the particles of abrasive in position thereon until they perform substantially to the full extent of their usefulness with the said supporting metal tending to keep pace with the wear of said abrasive particles so as to cause the cutting edges thereof to remain exposed during the use of the tool.

Another object is to provide an abrading tool formed of a metal composition of the above nature with means by which the said tool may be easily fitted and attached to an auxiliary support.

Another object is to provide a novel method of forming an abrading tool of a metallic composition of the above nature by hardening said tool to a controlled degree of hardness whereby the extent of usefulness of the tool may be greatly increased.

Another object is to provide a novel method of providing an abrading tool of the above nature with a portion thereon which may be soldered or otherwise mechanically connected to an auxiliary support.

Another object is to provide novel means and method of forming an abrading tool of the above character with a main body portion of non-solderable metal and a portion of solderable metal integrally or mechanically bonded with each other.

Another object is to provide improved means and method of forming abrading tools of the above character which will be less expensive and more durable and practical for use.

Other objects and advantages of the invention will become apparent from the following description taken in connection with the accompanying drawings and it will be apparent that many changes may be made in the details of construction, arrangement of parts and steps of the processes or methods shown and described without departing from the spirit of the invention as expressed in the accompanying claims. The invention, therefore, is not intended to be limited to the exact details, arrangements and methods shown and described as the preferred forms only have been given by way of illustration.

Referring to the drawings:

Fig. I is a top plan view of a tool embodying the invention;

Fig. II is a sectional view taken as on line II—II of Fig. I;

Fig. III is a plan view of a part of the tool illustrated in Fig. II which functions as the means by which the abrading portion of the tool may be fitted and detachably secured to an auxiliary support;

Fig. IV is a side elevation of the portion illustrated in Fig. III;

Fig. V is a diagrammatic fragmentary sectional view illustrating a step of the process of manufacture;

Fig. VI is a view generally similar to Fig. V illustrating a further step in the process of manufacture;

Fig. VII is a fragmentary side elevation shown partially in section of a press used in the process of manufacture;

Figs. VIII, IX, X, XI, and XII are views generally similar to Figs. V and VI illustrating the various steps of making a modified form of the invention.

Fig. XIII is a side elevational view of a tool resulting from the steps of the process illustrated in Figs. VIII through XII;

Fig. XIV is a diagrammatic sectional view of a furnace illustrating a step in the process of manufacture of the tools of Figs. I, II, and XIII;

Fig. XV is a diagrammatic sectional view illustrating a further step in the process of manufacture;

Fig. XVI is a diagrammatic sectional view of another modified form of furnace arrangement.

The invention, in this particular instance, relates to the forming of interchangeable abrading tools for use with machines for abarding lenses. Such tools are adapted to be held by an auxiliary support by which they are secured to the abrading machine. Such tools are formed of particles of abrasive supported by a sintered mixture of metal functioning as means for supporting the abrasive particles during the abrading operation.

One of the main features of the invention is to provide an abrading tool which will have maximum efficiency and durability to produce the greatest amount of abraded surfaces with a single tool. The tool must be of such a nature as to support the particles of abrasive until they perform the major extent of their usefulness prior to their being dislodged from the supporting means and the supporting means must be of such a nature as to substantially keep pace with the wear of the abrasive particles so as to cause the cutting edges thereof to remain exposed to most efficiently perform their abrading characteristics and means must be provided whereby the tools may be quickly and easily attached to or removed from the auxiliary support. These, and other objects of the invention, particularly that of providing a simple and economical method of forming the tools, are the essence of the present invention.

Referring more particularly to the drawings wherein like characters of reference designate like parts throughout the several views the preferred form of tool, as shown in Figs. I and II, comprises a main effective abrading portion 1 formed of a mixture of particles of abrasive such as crushed diamonds, sapphires, corrundum or other suitable abrasive means and particles of metal bonded together by a sintering process. The main effective abrading portion 1 of the tool has an outer surface 2 of a preformed desired contour shape which will generate the various surface curvatures desired on the lenses or articles to be ground thereby. This main effective abrading portion 2 is of a controlled thickness having an inner surface 3 shaped to engage a contiguous surface of a backing support 4 formed mainly of sintered metallic particles preferably of a similar characteristic as the metallic particles functioning as a bonding means for the abrasive particles of the effective abrading portion 1 of the tool or of any desirable metallic particles which will bond with the metallic particles which support the abrasive means. It is particularly pointed out that the effective abrading portion of the tool 1 has an outer portion 5 which is thicker than its adjacent inner portion 6. The purpose of this arrangement is to provide a greater amount of abrasive charged material throughout the portion 5 which is used in generating concaved surfaces. The reason for this is that more concaved surfaces are generated than convex surfaces and by forming the portion of the tool 5 thicker the said tool has a more balanced general use in forming both the concave and convex surfaces; that is, one portion for forming one of said surfaces is so balanced that it will not spend its extent of usefulness ahead of the other portion so that the tool thereby has a greater range of general use. This is controlled by the particular shape of the inner surface 3 of the tool as illustrated in Fig. II. In order to provide the effective abrading portion of the tool with maximum curve generating efficiency and in order to cause the supporting sintered particles of metal to substantially keep pace with the wear of the particles of abrasive embedded therein the type of material used in forming said support for said abrasive particles is carefully controlled as will hereinafter be more specifically disclosed. It has been found from experience that in order to obtain maximum efficiency as regards the above features the metals which produce the desired results are substantially non-solderable and are difficult to machine. In order to overcome this difficulty and during the forming of the backing support 4 an annular member 7 of mild machine steel of extremely low carbon content or other solderable metals is provided. This annular member 7 has a surface 8 adapted to be fitted to an auxiliary support 9 for the tool, as illustrated in Fig. II, and is provided with an annular substantially central tongue 10 which, as illustrated in Figs. III and IV, is provided with a plurality of angularly disposed slots 11. The tongue 10 is provided with a relatively sharp edge 12 and tapers outwardly from said sharp edge toward the main annular portion 7 thereof to substantially parallelly related curved channel portions 13 and 14. Each of said channel portions has outwardly tapering walls 15 and 16 providing relatively sharp edged rim portions encircling the central tongue 10. The annular member 7 formed of mild machine steel or other solderable metal is adapted to become attached to the backing support 4 through a chemical and mechanical bond with the said mechanical bond resulting from the interlocking of the tongue 10 with the heat joined particles of metal forming the backing support 4. This interlocking being brought about through the outward and inward deflection of the relatively sharp edge 17 of the tongue 10 adjacent the slots 11 by prior bending or by bending which takes place during the fabrication of the tool and also through the interlocking of the heat joined particles of metal of the backing support 4 within the various angularly disposed slots 11. When in secured relation with the backing support 4 the annular member 7 may be machined throughout its inner surface 18 to fit a central pertuberance 19 on the auxiliary support 9 and the bottom surface 8 of the annular member 7 may be joined to the auxiliary support 9 by soldering or the like. It being understood, of course, that the engaging surface 8 and adjacent surface of the portion 9 are machined so as to suitably fit each other prior to said soldering operation. The central pertuberance 19 interfitting within the annular recess of the main portion of the tool provides means for centering the tool with the auxiliary support 9. This is brought about by forming the peripheral contour of the pertuberance concentric with the axis 21 of the auxiliary support 9.

In forming the tool illustrated in Figs. I and II the annular member 7 is supported on a sleeve 22 mounted within a tubular member 23, in a casing 24. A central arbor like member 25 is placed within the sleeve 22 and extends upwardly through the annular member 7. The members 22, 23, and 25 are preferably formed of a hardened steel with the casing 24 formed of a relatively soft steel. The portion of the arbor-like member 25 extending upwardly through the annular member 7 is spaced relative to the inner wall of the tube 23 and controls the thickness of the wall of the backing support of the finished tool. Particles of metal 26 of a sufficient amount to form the backing support 4 are placed within the space between the arbor-like member 25 and tube 23 above the annular member 7 with the said particles being arranged to substantially the same level above the annular member 7. A hollow plunger 27 having a preformed face 28 of the shape desired of the interface 3 is placed in the die formed by the parts 22 to 25 inclusive and the assembly is then placed in a press 29. This press 29 may be of any suitable known type. For ease of illustration there is shown a press comprising a base plate 30 having uprights 31 thereon on which a second plate 32 is slidably supported. Suitable compression springs 33 normally urge the plate 32 in a direction away from the base plate 30. Suitable stop means, such as nuts 34, limit the upward movement of the plate 32. The die members 24 and 27 having the annular member 7 and material 26 to be compressed therein is placed between the plates 30 and 32. A plunger 35 slidably mounted in the casing 36 is forced downwardly by hydraulic pressure or the like or through compressed air directed through an inlet 37 into a chamber 38. It is to be understood that the above press and function thereof is given only by way of illustration. For example, instead of the pressure being exerted only from one direction the pressure may be applied in an upward and downward direction or, so as to produce a reciprocal pressure, simultaneously, or the dies may be arranged to float under the action of pressure. In any event the arrangement should be such as to tend to bring about an equalization of pressure throughout the mass. The pressure exerted on the metal particles 26 depends of course upon the nature and size of the metal particles used. In this instance, the metal particles preferably comprising approximately 16.5% of copper and 83.5% of chromium of approximately from 200 to 325 mesh. The copper and chromium are of substantially the same mesh and are preferably thoroughly mixed in a suitable tumbling machine or the like for a period of approximately twelve hours or for a duration sufficient to completely mix the particles with each other. The plunger 27 is placed under a pressure of approximately 20 tons per square inch causing the particles of the mixture 26 of the copper and chromium to be compressed into relatively intimate relation with each other and with the parts of the annular member 7 and to cause the upper edge thereof to assume the shape of the face 28 of the plunger 27. The plunger 27 is then removed. Particles of abrasive of a desired mesh ranging between 80 to 115 or other suitable mesh depending upon the working characteristics desired and metal particles comprising 16.5% of copper and 83.5% of chromium are thoroughly mixed in a tumbling machine or the like for a duration sufficient to substantially equally distribute the abrasive particles in the metallic particles. It is also to be understood that the proportion of the abrasive to the powdered metal is varied according to the abrading characteristics desired of the tool. By increasing the amount of abrasive particles the abrading function of the tool is increased and vice versa. This mixture of particles of metal and abrasive such as set forth above is then placed in the mold as illustrated at 39 in Fig. VI above the compressed particles 26 which form the backing support 4 and are preferably levelled off in said mold. It being understood, of course, that the proper proportion of the mixture 26 is controlled to produce the size of backing support 4 desired. The proportion of this mixture of particles of metal and abrasive is sufficient to produce the effective abrading layer 1 of the tool. The interface 3 formed by the shape 28 of the end surface of the plunger 27 is preferably first dusted with a copper powder just prior to placing the mixture 39 in the mold. A plunger 40 having an end surface 41 of the shape desired on the surface 2 of the abrading tool is then placed in the mold and the assembly is placed in the press 29 and a pressure of approximately 60 tons per square inch is then applied. The compressed assembly including the annular member 7 is then removed from the mold and placed in a suitable furnace and heated to approximately 2500° F. for a duration of approximately 5 minutes. This heating is preferably formed in the absence of oxygen to prevent burning, scaling and so forth of the material during the heat treatment. This may be accomplished in many different ways. By way of illustration the compressed assemblies designated 42 in Fig. XIV may be placed in a container 43 containing coke dust or the like 44 which completely surrounds the assemblies 42. In this manner several of the compressed assemblies may be simultaneously heat treated. The coke is preferably used for reducing atmosphere. A suitable cover 45 is placed on the top of the container 42 and is sealed on with a high temperature cement 46. The said cement can be produced by combined fire clay and cement or may be of any other desirable cement of the type which withstands heat. The packed container 43, including the coke dust and assemblies 42, are then placed in a suitable furnace diagrammatically illustrated at 47, in Fig. XV, at approximately room temperature. The said furnace comprises a heat chamber 48 having a suitable heating unit 49 therein and having a closure member 50 adjacent one end thereof by means of which the container may be inserted or removed from the furnace. The temperature of the furnace is raised to approximately 1000° F. in approximately 70 minutes. The temperature is then slowly raised to approximately 2000° F. throughout an interval of approximately 50 minutes and is held at said 2000° F. for approximately 30 minutes. The temperature is then raised to approximately 2500° F. over a period of thirty minutes with the total heating time approximately three hours.

The heat is then shut off at the end of the time interval set forth above and allowed to cool down to room temperature from the approximate high temperature of 2500° F. Of course, it is to be understood that the temperatures and time may be varied according to the size of container 43, amount of coke used, etc., and desired degree of hardness of the resulting tool. The coke dust is preferably used for the purpose of absorbing the oxygen content in the air and functions as a deoxidizer to prevent burning of the materials, scaling, etc. and to properly bond the metal particles. Hydrogen, carbon monoxide or any other deoxidizing agent might be used instead of coke dust. In this particular instance the furnace of the type illustrated diagrammatically in Fig.

XVI might be used. The furnace in this instance comprises a chamber 51 having a plate 52 on which the tool assemblies 42 are positioned. A controlled flow of a desired deoxidizing agent is directed through an inlet 53 through the chamber 51 and thence outwardly through an outlet 54. Any suitable heat generating means 55 may be used under the chamber 51 to heat the assemblies 42 to desired temperature. By reason of the fact that there is a continuous flow of a deoxidizing agent through the chamber 51 the oxygen is driven off and the heating takes place without danger of burning or scaling, etc., the assemblies that are being heated thereby creating a complete bonding of the metal particles.

If desired, the assemblies 42 may be subjected to a temperature of 2500° F. for a period of 5 minutes in a controlled neutral atmosphere. In this latter instance, the heated assemblies are directly removed from the furnace and quenched in oil or subjected to other suitable treatment for hardening such as by a compartively slower cooling in a deoxidizing atmosphere. The temperature and time interval of heating of course is controlled according to the degree of hardness desired. The desired degree of hardness ranges between 68 to 82 as read from a scleroscope. Of course, the degree of density of the tool may be controlled by the size of the metal particles, amount of pressure and heat used during the fabrication of the tool. The tool resulting from the above assembly, as illustrated in Fig. II, is preferably the combined portions 1, 4 and 7 with the portions 1 and 4 bonded together through an alloying which takes place throughout the interface 3 with the portions 4 and 7 having a combined mechanical and chemical bond. The mechancial bond being insured through the provision of the slotted circumferential tongue 10 which extends within and is anchored through the heating and sintering process internally of the backing support 4. The annular member 7 being of a mild machine steel or other solderable metal will naturally be much softer than the metal of the sintered backing support or effective abrading portion 1 of the tool. The metals set forth above for said portions 1 and 4 result in a composition which has relatively non-solderable characteristics. It is very hard and difficult to machine. Through the use of an auxiliary annular member 7, such as illustrated in Fig. II, means is provided which may be easily machined so that the said annular member may be fitted to the protrusion 19 of the auxiliary support 9 and the engaging surfaces of said annular portion 7 with the portion 9 may be joined by soldering as illustrated at 20 or by other bonding means. It is apparent that the said annular member 7 may be increased in thickness so that mechanical binding means, such as screws or the like, may be used to anchor the said abrading member to the auxiliary support 9. The auxiliary support 9 is provided with a tapered recess 55 by means of which it may be attached to the spindle of an abrading machine. The tapered opening of course is co-axial with the axis 21 of the tool and the abrading element is also co-axial with said axis.

It is to be understood that although applicant has shown and described an abrading tool of an annular type other shapes of abrading surfaces may be formed as desired.

Referring now to Figs. VIII to XIII inclusive a modified form of tool may be formed by placing a layer of metal 56 of a mixture of approximately 95% of either cobalt, iron, nickel or metal or combination of metals of a high melting point that is solderable and machineable and approximately 5% copper in the mold as illustrated in Fig. VIII; the said mold being formed in a manner similar to that of the mold illustrated in Fig. V. The layer 56 is levelled off by suitable means and a relatively thin bushing 57 is then inserted over the central arbor-like member 25 and a spacer sleeve 58 is inserted between said arbor and sleeve 57 to hold said sleeve in position. The lower end of the sleeve 59 engages and if desired may be slightly embedded in the layer of metal particles 56. A suitable proportion of a mixture of metal particles 60 of approximately 16.5% of copper and 83.5% of chromium is placed in the mold as illustrated in Fig. IX between the sleeve 57 and tube 23 of the molding die. The amount of the mixture 60 placed in the mold depends upon the thickness of the backing support 61 desired in the completed tool, such as illustrated in Fig. XIII. The spacer sleeve 58 is then removed and a deposit of metal particles of the mixture of approximately 95% cobalt and 5% of copper is then placed between the relatively thin sleeve 57 and the arbor 25 as illustrated at 62 in Fig. X. It is particularly pointed out that the deposit 62 engages the deposit 56 as illustrated at 63. The relatively thin sleeve 57 is then carefully removed to allow the particles of metal of the mixture 60 to move into engagement with the particles of metal of the deposits 56 and 62. The plunger 27 having the preshaped end surface 28 thereon of the shape desired of the interface 64 of the tool illustrated in Fig. XIII is then placed in the mold as illustrated in Fig. XI. The assembly is then placed in a suitable press such as illustrated in Fig. VII and the particles of metal are pressed into adjacent relation with each other. The pressure in this particular instance is approximately 20 tons per square inch, it being understood, of course, that the deposit 60 has been previously levelled off prior to said compressing. The plunger 27 is then removed and a suitable amount of a mixture of metal particles such as set forth above for the deposit 60 and containing abrasive particles such as crushed diamonds, sapphires or the like is then placed in the mold, as illustrated at 65. The interface 64 is preferably first dusted with copper powder prior to placing the deposit 65 in the mold. The deposit 65 in this particular instance comprises approximately 38 grams of the mixture of chromium and copper as set forth above with approximately 8k. of diamond particles of a desired mesh depending upon the type of tool desired. The plunger 40 having an end surface 41 thereon of the shape desired on the effective abrading surface of the tool is then placed in the mold and a pressure of approximately 60 tons per square inch is applied. This pressure is preferably applied with the members 22 and 25 protruding below the members 23 and 24 when the assembly is placed in the press 29.

The resulting compressed assembly is then removed from the mold and heat treated by any one of the heat treatments set forth above preferably the slow cool method. The amount of the deposit 65 is controlled so as to produce the desired finished thickness of the effective abrading portion 66 of the tool. In the resulting article the layer 56 and layer produced by the deposit 62 will have a bond throughout its contiguous surface 67 with the backing support 61 of the tool. The bond is essentially brought about by the interfitting of the particles of the layers 56, 62 and 61 through an inherent irregularity which results from the removal of the relatively thin sleeve 57 from the mold. The bond may be increased by using a coarser mesh of metal particles for the portions 56 and 62. The resulting layers 56 and 62 therefore provide a machineable metallic composition which is softer than the material of the backing support 61 and bonding material of the layer 66 and is also solderable.

The tools resulting from the above processes will have an effective abrading surface which is relatively hard and resistant to wear with the degree of hardness such that the said effective abrading surface will not scale over and reduce the effectiveness of the abrasive particles held by said layer. The hardness is preferably such that the wear of the bonding material of the layer 66 will substantially keep pace with the wear of the abrasive particles so as to insure their performing to the fullest extent of their usefulness prior to their being dislodged from the tool.

Other mixtures of particles of metal for use as the bonding material for the abrasive particles and for the backing support of tools of the character set forth above may be formed as follows:

A. A mixture of approximately 50% of chromium plus approximately 50% of copper or the copper may be reduced to approximately 5% combined with 95% chromium depending upon the resultant hardness and working characteristics desired. The greater amount of chromium used the greater hardness and wear resistance the tool will have. The resultant hardness is controlled by the temperature and pressure used in fabricating the tool.

B. A mixture of approximately 40 to 50% of nickel, approximately 30 to 45% of copper and approximately 10 to 20% of tin, with the latter mixture a pressure of approximately 17 tons per square inch is applied to the particles forming the backing suport of the tool. The pressure applied to the assembly when the mixture of bonding material and particles of abrasive are placed in the die to form the effective abrading portions 1 or 66 of the tool as the case may be is approximately 35 tons per square inch and a heat temperature ranging between 1600° to 1925° F. is used with the temperature of 1600° being raised from room temperature throughout an interval of from approximately 60 to 80 minutes.

The temperature is raised slowly to approximately 1700° F. throughout an interval of 50 minutes and is held at 1700° F. for approximately 30 minutes and then raised again to between 1725° F. to 1925° F. This takes place throughout an interval of approximately 30 minutes. The tool is then allowed to cool down to room temperature. The heating in this particular instance takes place under deoxidized conditions through the use of coke and other deoxidizing agents such as previously set forth above.

C. A mixture of approximately 10 to 25% of copper with from 75 to 90% of cobalt. In this instance a pressure of approximately 60 tons per square inch is used and a heat treatment of approximately 2500° F. is used for a period of 5 minutes. The tool may be cooled either by quenching or slow cooled preferably in controlled atmospheres. In all instances to insure bonding throughout the interfaces 4 or 64 of the tools, as the case may be, the said interfaces are preferably dusted with copper powder during the fabrication of the tool. A tool formed by the mixture of approximately 16.5% of copper and 83.5% of cobalt has a hardness of approximately 20 as obtained from average readings of a scleroscope Of course, it is to be understood that a mixture D of approximately 16.5% of copper and 83.5% of chromium may be used as previously set forth above in which instance the hardness reading will be from 50 to 75 as taken by a scleroscope depending upon the hardness desired. Of course the hardness may be of any controlled amount arrived at by controlling of pressures and heat treatment. It has been found that it is preferable to have different degrees of hardness for use with different types of glass or other material to be abraded as well as different grinding applications. This is one of the most preferred mixtures for use in forming the backing support and bonding means for the abrasive particles.

The various different mixtures of particles of metal for forming the backing supports and bonding means for the abrasive particles of the tools may be compressed and heated according to the degree of density desired, hardness and resistance to wear desired and, of course, the said pressures and temperatures will have to be varied according to the particular mixtures of metal used. The heating may be accomplished by any of the methods set forth above or by any other known means of heating under deoxidized conditions. If a mixture of approximately 16.5% of copper and 83.5% of cobalt were used, of course, no auxiliary solderable layer such as illustrated at 7 or 56 would be necessary as the material of said mixture will readily solder with the auxiliary support. This is also true if the mixture of nickel, copper and tin is used, such as set forth above. The preferred mixture, however, is approximately 16.5% copper and 83.5% of chromium which produces the desired wear resisting and abrasive holding characteristics of the tool but has a non-solderable nature. In order, therefore, to provide a main tool portion that may be soldered to an auxiliary support 9, a solderable metal such as set forth for the annular member 7 or for the layers 56 and 62 may be used. The said solderable metals used for said annular member 7 and layers 56 and 62 are of such a nature as to have to a greater extent a mechanical bond and to a lesser extent a chemical or alloying bond with the metal of the main tool portion.

In the construction, illustrated in Fig. II, more of a mechanical bond exists as is intended by the particular construction of the annular member 7 used. It is to be understood that the details of construction of the annular member 7 may be varied in order to produce the desired type of mechanical bond. This one particular design being shown and described only by way of illustration. It is to be understood that the mesh of the particles of metal used for the various different layers may be substantially consistent with the mesh set forth for the 16.5% of copper and 83.5% of chromium mixtures set forth above.

Grinding tools or laps, as commonly known in the ophthalmic art and as formed according to the present invention, are intended for various different types of grinding or abrading. It is therefore in accordance with the present invention to provide tools or laps which are particularly adaptable for the particular use to which they are to be put. This, therefore, means that for one type of grinding a tool of a different hardness may be used than for another type of grinding and yet obtain the desired speed and efficiency of grinding. A tool for said particular grinding has the desired durability and effectiveness. The invention, therefore, is intended to cover all different types of tools with different degrees of hardness and wear resistance according to the pressure and temperature controls used in fabricating the tool and of the particular compositions of metal used for said tools, in accordance with the teachings of the present invention.

From the foregoing description it will be seen that simple, efficient and economical means and methods have been provided for accomplishing all of the objects and advantages of the invention.

Having described my invention, I claim:

1. An abrading tool comprising abrasive particles substantially uniformly dispersed throughout a sintered mixture of approximately 40 to 50% nickel, 30 to 45% copper and 10 to 20% tin.

2. An abrading tool comprising abrasive particles substantially uniformly dispersed throughout a sintered mixture of approximately 40 to 50% nickel, 30 to 45% copper and 10 to 20% tin and having a backing support of solderable metal thereon.

3. An abrading tool comprising a mixture of particles of abrasive and particles of metal which metal particles are heat joined with each other to support the abrasive particles therein to form the effective abrading portion of the tool and a backing support of heat joined particles of metal, said backing support and the effective abrading portion of the tool being joined with each other throughout an interface of a compound curvature which is such as to cause the effective abrading portion of the tool to be of given varied thicknesses throughout the effective abrading portion thereof to cause said tool to have a given prolonged use for which the tool is designed and said backing support having a surface portion shaped to engage and fit an auxiliary support and to be attached thereto with the metallic particles of the main abrading portion of the tool and of the greater portion of the backing support comprising a mixture of approximately 40 to 50% of nickel, approximately 30 to 45% of copper and approximately 10 to 20% of tin.

4. The process of forming an abrading tool comprising forming a mixture of metallic particles comprising approximately 40 to 50% nickel, approximately 30 to 45% copper and approximately 10 to 20% tin, placing a deposit of a given amount of said metal within confined dies, mixing particles of abrasive with said mixture of metals and placing a given amount of said mixture in the confined dies above the first deposit and applying pressure and heat to said mixtures of an amount to bring about a sintering of the particles of metal with the said dies being so controlled as to shape as to produce the resultant shape of abrading tool desired.

5. An abrading tool comprising an effective abrading portion and a backing support for said abrading portion, said effective abrading portion comprising a mixture of particles of abrasive with metallic particles comprising approximately 40 to 50% nickel, 20 to 45% copper and 10 to 20% tin and said backing support comprising a mixture of metallic particles essentially the same as those of the effective abrading portion, said backing support and effective abrading portion and said metallic particles being joined with each other by sintering.

6. An abrading tool comprising an effective abrading portion and a backing support for said abrading portion, said effective abrading portion comprising a mixture of particles of abrasive with metallic particles comprising approximately 40 to 50% nickel, 20 to 45% copper and 10 to 20% tin and said backing support comprising a mixture of metallic particles essentially the same as those of the effective abrading portion, said backing support and effective abrading portion and said metallic particles being joined with each other by sintering and an auxiliary support secured to said backing support and being of a solid metallic body.

JOSEPH T. KELLEHER.